Feb. 9, 1954 T. BACKUS 2,668,610
FLUID RELEASED CLUTCH
Filed Nov. 7, 1949 3 Sheets-Sheet 1

INVENTOR
Thomas Backus
BY Kenyon & Kenyon
ATTORNEYS

Feb. 9, 1954   T. BACKUS   2,668,610
FLUID RELEASED CLUTCH
Filed Nov. 7, 1949   3 Sheets-Sheet 2
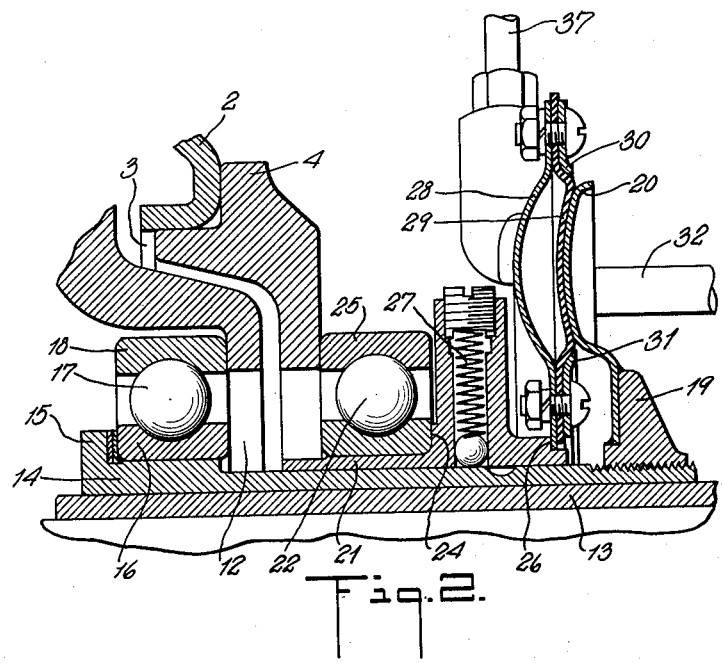
Fig. 2.
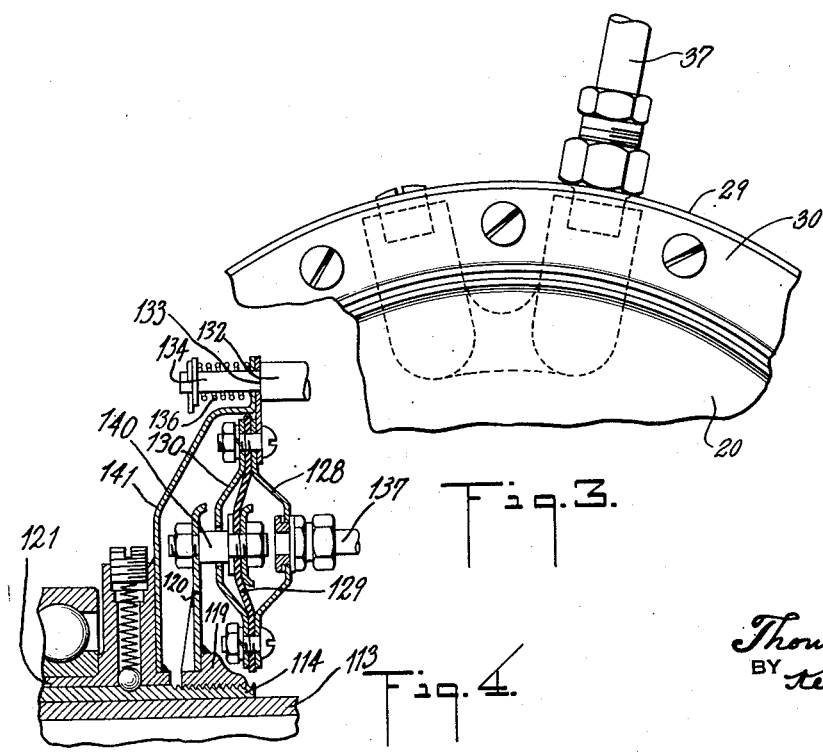
Fig. 3.
Fig. 4.
INVENTOR
Thomas Backus
BY Kenyon & Kenyon
ATTORNEYS Patented Feb. 9, 1954

2,668,610

UNITED STATES PATENT OFFICE 2,668,610

FLUID RELEASED CLUTCH

Thomas Backus, Kalamazoo, Mich., assignor to Fuller Manufacturing Company, Kalamazoo, Mich., a corporation of Delaware Application November 7, 1949, Serial No. 125,963

19 Claims. (Cl. 192—91)

This application is a continuation in part of application Serial No. 693,315, filed August 27, 1946, for Clutch, now abandoned.

This invention relates to clutches and in particular to friction disc clutches of the type used in automobiles and trucks.

It has for its objects:

(1) To provide a new and improved clutch of the type referred to above;

(2) To provide such a clutch which can be produced and installed as a self-contained unit and which is particularly adapted for remote control;

(3) To provide such a clutch which requires less pressure for operation than is ordinarily required in clutches which rely upon mechanical linkage for operation, since it eliminates substantially all such mechanical linkage and the very high friction which results at fulcrum points under the high spring pressure to which clutches of this type are loaded during release of the clutch;

(4) To provide such a clutch in which the reaction when the clutch is released on units adjacent to the clutch, such as the crankshaft, which normally takes such thrust, is eliminated;

(5) To provide such a clutch which is simple and may be manufactured economically.

(6) To provide such a clutch in which it is unnecessary to adjust the operating parts to compensate for wear or for similar purposes.

Further objects and advantages will be apparent from the following description of the invention and the accompanying drawings, in which:

Fig. 2 is a partial sectional view showing parts of the clutch shown in Fig. 1 but with the clutch disengaged, and Fig. 3 is a view showing the connection for connecting the hydraulic unit to a master cylinder.

Fig. 4 is a view of a different form of the invention in which a vacuum unit is used for its operation.

Figure 1:
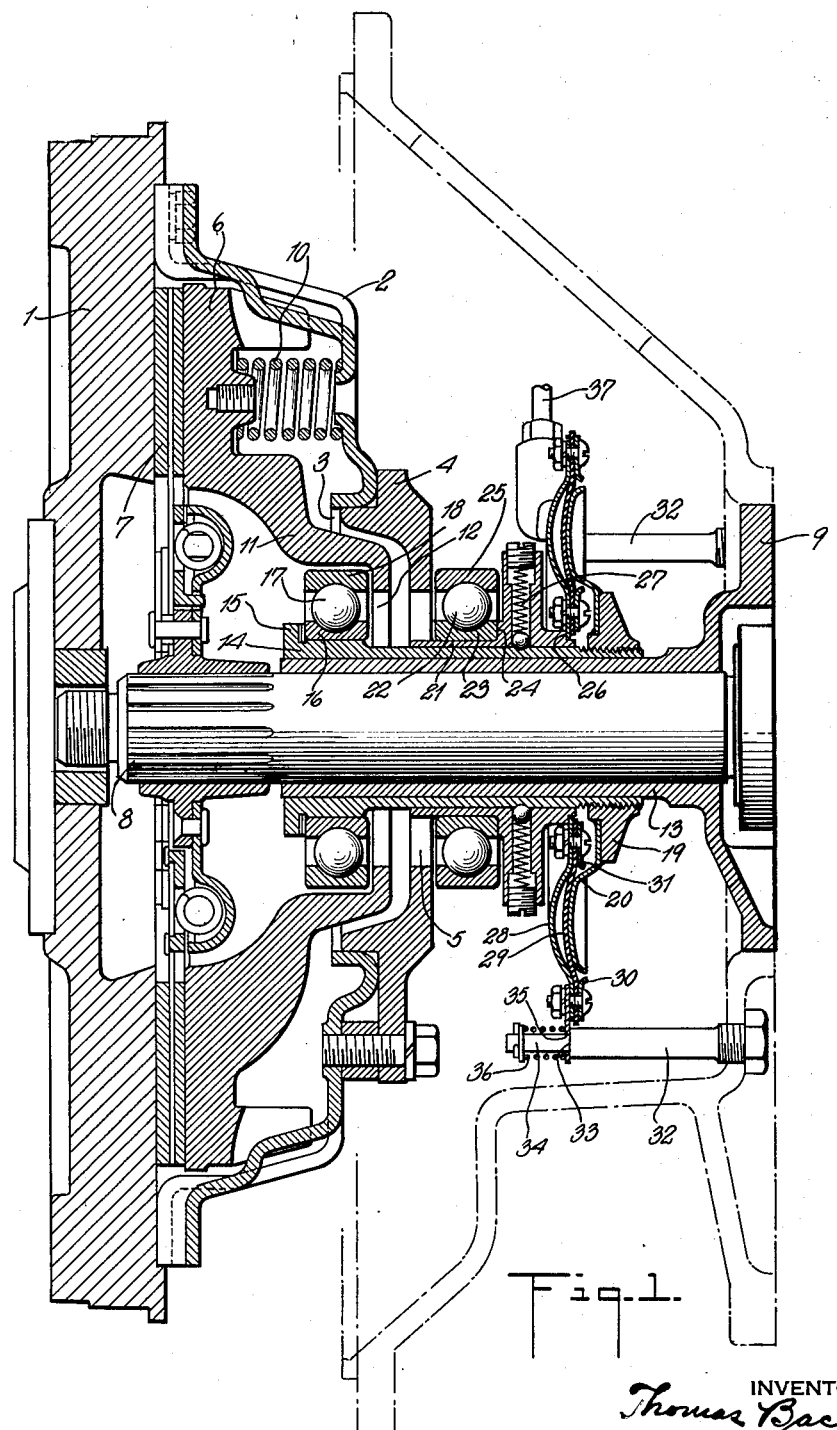
Fig. 1 is a sectional view of a clutch embodying my invention, showing the clutch in engaged position.

In the drawings, the clutch is shown disposed between a change speed transmission and an internal combustion engine, the fly wheel 1 of which forms a rotatable member of the clutch. Mounted on the fly wheel is a cover plate 2 which has an axial aperture 3 and an adapter 4 which is provided with a central axial aperture 5. Mounted between the fly wheel or rotatable member 1 and the cover plate 2 is an axially shiftable pressure plate 6, adapted to cooperate with the member 1 to clamp the driven disc member 7 which is splined to the shaft 8 which extends from the forward end of the front bearing cover of the transmission 9 to drive the same. The pressure plate 6 is urged to engaged position which is shown in Fig. 1 by compression springs 10 bearing on the cover plate 2 and on the pressure plate 6. The pressure plate 6 is provided with a web 11 which is axially apertured at 12.

A bearing member 13 through which the shaft 8 passes extends axially through the cover plate 2 and the pressure plate 6. Slideably mounted thereon is a sleeve 14 which extends axially through the apertures 5 and 12 in the cover plate 2 and the pressure plate 6, respectively. On the inner end of the sleeve 14 is an abutment 15 which engages the inner race 16 of the antifriction bearing 17, the outer race 18 of which is adapted and disposed to engage the pressure plate 6 to shift it to disengaged position when the sleeve 14 is moved to the right, as viewed in Fig. 1.

At the outer end of the sleeve 14 is an abutment 19 which is screw-threaded on the sleeve and which carries an annular metal stamping 20 which is adapted to engage the diaphragm of the hydraulic unit which disengages the clutch.

Slideably mounted on the sleeve 14 is a second sleeve 21 which, at its inner end, has a bearing 22, the inner race 23 of which engages a shoulder 24 on the sleeve 21 and the outer race 25 of which is adapted and positioned to engage the adapter 4 to halt movement of the sleeve 21 toward the cover plate. At the outer end of the sleeve 21 is a shoulder 26 which is adapted to engage the casing of the hydraulic unit which operates to disengage the clutch.

When the clutch is engaged the bearing 17 is positioned to provide a slight clearance of about $\frac{1}{32}$ of an inch between the race 18 and the pressure plate 6. The bearing 22 is likewise positioned with a slight clearance of about $\frac{1}{32}$ of an inch from the adapter 4 when the clutch is engaged. This permits rotation of the clutch parts without friction on the shifting mechanism. The sleeves 14 and 21 are held in this relative position by a spring pressed detent 27, and by the hydraulic unit and the support.

The hydraulic unit which operates the clutch consists of an annular casing 28 which has a flexible diaphragm 29 which engages the member 20 as shown in Fig. 1 and which is held in place by annular plates 30 and 31. The casing 28 engages the shoulder 26 on the sleeve 21. The hydraulic unit is held in place by studs 32 which have shoulders 33 and reduced portions 34 fitting through apertures 35 on the hydraulic casing 28. The hydraulic unit is held against the shoulders 33 by compression springs 36 which are anchored on the reduced portions 34 of the studs 32 and which permit a slight movement of the hydraulic unit to the left, as viewed in Fig. 1.

Hydraulic fluid is admitted to the casing through a pipe 37 which leads from a suitable master cylinder which is not shown in the drawings but which can be of any conventional type and which supplies hydraulic fluid in a conventional manner.

In the operation of the clutch for disengagement, hydraulic fluid is introduced into the casing 28. This causes the diaphragm 29 to press against the member 20 and causes a slight shifting movement of the sleeve 14 to bring the outer race 18 of the bearing 17 into engagement with the pressure plate 6. During this movement, the spring pressed detent 27 holds the sleeve 21 in position on the sleeve 14. However, as more hydraulic fluid is introduced into the casing the detent releases and sleeve 21 moves toward the cover plate 2 as does the hydraulic housing 28 until contact is established between the outer race 25 of the bearing 22 and the adapter 4. The introduction of further hydraulic fluid then exerts pressure through the sleeve 14 on the pressure plate 6 moving it to the right as viewed in Fig. 1 until it assumes the position shown in Fig. 2, releasing the driven member 7 of the clutch.

Thrusts which ordinarily would be taken by the cover plate when the clutch is released and thence transferred to the crankshaft are no longer thus transferred to the cover plate and thence to the crankshaft. The reaction proceeds from the cover plate 2 to the adapter 4 thence to race 25 through bearing 22 and abutment 24 to a sleeve 21, abutment 26 and the hydraulic casing 28. The opposite end of the clutch spring at this time exerts pressure against the pressure plate 6 which proceeds to race 18, through bearing 17 to abutment 15 thence through sleeve 14 and abutment 19 to the annular member 20 and thence to diaphragm 29. Since the pressure exerted on diaphragm 29 is toward the engine and the pressure on the hydraulic casing 28 is away from the engine, the two forces balance out in the hydraulic or other medium used in diaphragm 29 and casing 28.

The clutch above described eliminates substantially all mechanical linkage which is commonly employed for disengaging such a clutch, and considerably less pressure is required since during the disengagement of a clutch involving this linkage considerable friction is introduced at the fulcrum points. The unit can be made as a self-contained unit and is particularly well adapted for remote control operation, or, if desired, for use in connection with a power source as a booster.

I have described my invention with a hydraulically-operated diaphragm. It will be understood that air or other gas could be used instead of hydraulic fluid in the form of invention above described.

In the form of invention shown in Fig. 4, the clutch is operated by vacuum. The bearing member 113, sleeve 114 and the second sleeve 121 correspond to the bearing member 113 and the sleeves 14 and 21 of the clutch shown in Figs. 1 to 3, and are so arranged that the slight movement of the sleeve 121 to the left as viewed in Fig. 4, to engage the cover plate adapter and the movement of the sleeve 114 to the right as viewed in Fig. 4 will disengage the clutch as it is disengaged by corresponding movements of the sleeves 21 and 14 in the form of clutch shown in said Figs. 1 to 3.

The relative movement of sleeves 114 and 121 is brought about by means of a vacuum operated diaphragm which is suitably connected to said sleeves. The diaphragm is shown at 129. It is connected by a bolt 140 to a member 120 which engages the abutment 119 which is screw threaded on the sleeve 114. The diaphragm is an annular diaphragm and is suitably clamped to a casing 128 by means of an annular clamping ring 130 which extends nearly to the bolt 140 to protect the diaphragm. The casing 128 is secured to the sleeve 121 by means of the member 141.

The stud 132 which is comparable to the stud 32 of the form of invention shown in Fig. 1, is shouldered at 133 forming a reduced portion 134 which is surrounded by compression spring 136 which is anchored on the reduced portion 134 of the stud 132 and permits movement of the unit to the left as viewed in Fig. 4.

The air or other gas between the casing 128 and the diaphragm 129 is exhausted through a connection 137 which is connected to any suitable vacuum producing means.

When vacuum is applied, a slight shifting movement of sleeve 114 to the right as viewed in Fig. 4 first results. Thereafter, there is slight shifting movement of the sleeve 121 to the left as viewed in Fig. 4. This places the bearings in contact with the pressure plate 11 and the adapter 4, and the operation continues as in the form of invention described in Figs. 1 to 3, the continued application of the vacuum moving the sleeve 114 farther to the right as viewed in Fig. 4 to disengage the clutch.

Figure 5:
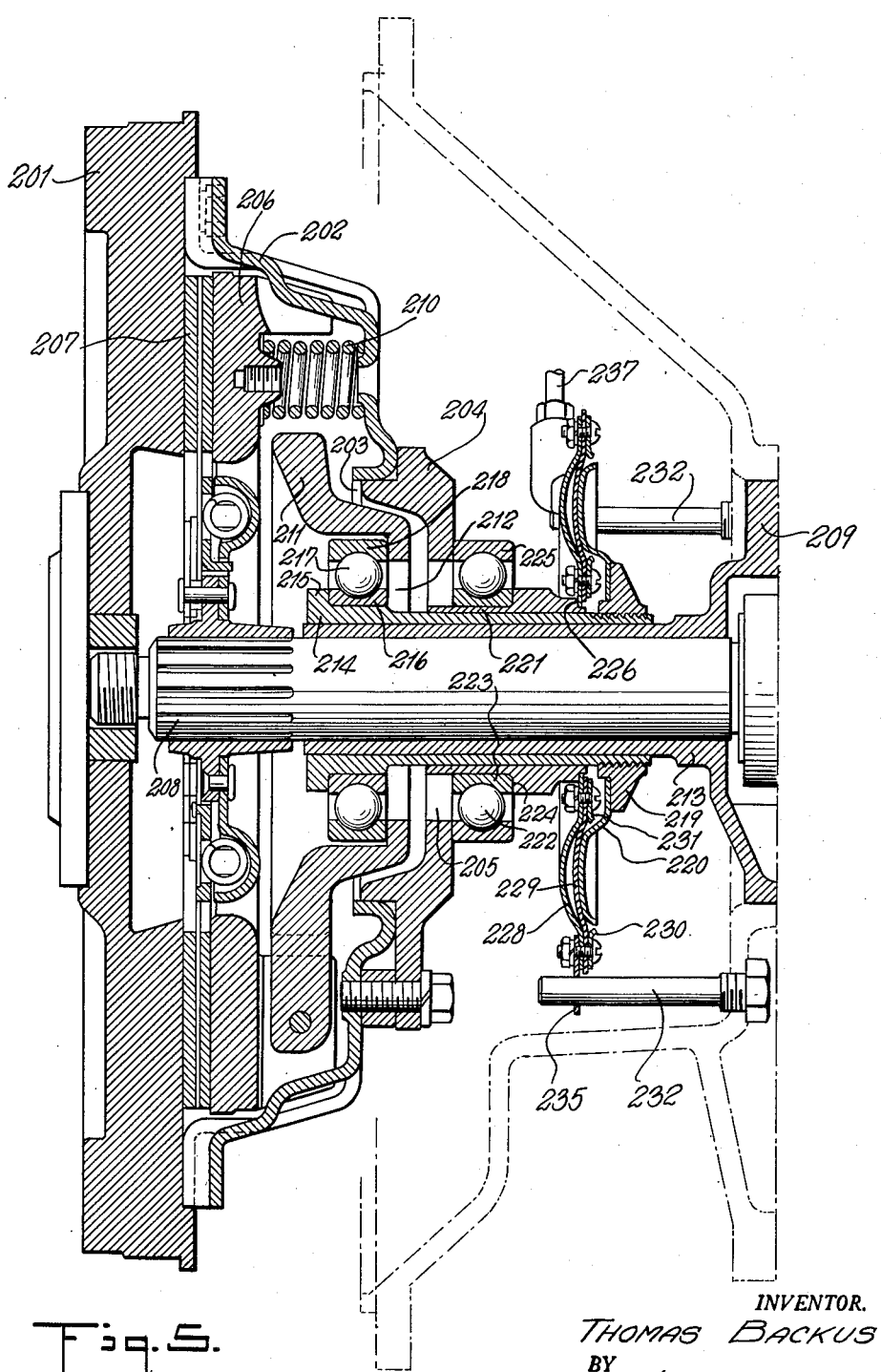
Fig. 5 is a sectional view of a clutch embodying a different form of my invention showing the clutch in engaged position.

The form of invention shown in Fig. 5 corresponds generally to the form of invention shown in Fig. 1, but the parts are so arranged that the clutch does not require adjustment, since the clutch operating parts are so disposed that they are self-adjusting.

The clutch shown in Fig. 5 is disposed between the change speed transmission and an internal combustion engine, the fly wheel 201 of which forms a rotatable member of the clutch. Mounted on the fly wheel is a cover plate 202, which has an axial aperture 203 and an adapter 204, which is provided with a central axial aperture 205. Mounted between the fly wheel or rotatable member 201 and the cover plate 202 is an axially shiftable pressure plate 206 adapted to cooperate with the member 201 to clamp the driven disc member 207, which is splined to the shaft 208, which extends from the forward end of the front bearing cover of the transmission 209 to drive the same. The pressure plate 206 is urged to engaged position, which is shown in Fig. 5, by compression springs 210 bearing on the cover plate 202 and on the pressure plate 206. The pressure plate 206 is provided with a web 211, which is axially apertured at 212.

A bearing member 213, through which the shaft 208 passes, extends axially through the cover plate 202 and the pressure plate 206. A sleeve 214, which extends axially through the apertures 205 and 212 in the cover plate 202 and the pressure plate 206, respectively, is mounted on the bearing member 213 and is free to float axially on the bearing member 213. On the inner end of the sleeve 214 is an abutment 215, which engages the inner race 216 of the anti-friction bearing 217, the outer race 218 of which is adapted and disposed to engage the pressure plate 206 to shift it to disengaged position when the sleeve 214 is moved to the right as viewed in Fig. 5. At the outer end of sleeve 214 is an abutment 219, which is screw-threaded on the sleeve and which carries an annular metal stamping 220, which is adapted to engage the diaphragm of the hydraulic unit which disengages the clutch.

A second sleeve 221 is mounted on the sleeve 214 in such a way that it is free to float axially. At its inner end it has an anti-friction bearing 222, the inner race 223 of which engages a shoulder 224 on the sleeve 221, and the outer race 225 of which is adapted and positioned to engage the adapter 204 to halt movement of the sleeve 221 toward the cover plate. At the outer end of the sleeve 221 is a shoulder 226, which is adapted to engage the casing of the hydraulic unit which operates to disengage the clutch.

The hydraulic unit which operates the clutch consists of an annular casing 228 which has a flexible diaphragm 229 which engages the member 220, as shown in Fig. 5, and which is held in place by annular plates 230 and 231. The casing 228 engages the shoulder 226 on the sleeve 221. The hydraulic unit is held in place against rotation by studs 232 fitting through apertures 235 on the hydraulic casing 228 and is free to float axially along said studs 232 to accommodate floating of the sleeve 221.

Hydraulic fluid is admitted to the casing through a pipe 237, which leads from a suitable master cylinder, which is not shown in the drawings but which can be of any conventional type and which supplies hydraulic fluid in a conventional manner.

In this form of the invention, the bearing members 217 and 222 are preferably maintained in contact with the pressure plate 206 and the adapter 204 at all times and even when the clutch is in the engaged position as shown in Fig. 5. This may be accomplished by maintaining a low line pressure on the hydraulic operator, even during clutch engagement, the pressure being of an order having no material effect on the spring means 210.

Because the sleeves 214 and 221 are free to float axially, they can maintain this position regardless of wear on the clutching parts, so that the clutch operating mechanism is in a position to operate through the introduction of added pressure to the hydraulic system sufficient to overcome the force of the springs 210. In operation, when the added pressure is applied to disengage the clutch, hydraulic fluid is introduced into the casing 228. This causes the diaphragm 229 to press against the member 220 and causes sleeve 214 to move toward the cover plate 202 and move the pressure plate 206 in the same direction, namely, to the right, as viewed in Fig. 5, until the driven member 207 of the clutch is released, thus disengaging the clutch.

As in the form of invention shown in Fig. 1, the thrusts, which ordinarily would be taken by the cover plate when the clutch is released and thence transferred to the crankshaft, are no longer thus transferred. The reaction proceeds from the cover plate 202 to the adapter 204, thence to the race 225 through bearing 222 and abutment 224 to the sleeve 221, abutment 226 and the hydraulic casing 228. The clutch spring at this time exerts pressure against the pressure plate 206 which proceeds to race 218 through bearing 217 to abutment 215, thence through sleeve 214 and abutment 219 to the annular member 220 and thence to diaphragm 229. Since the pressure exerted on the diaphragm 229 is toward the engine and the pressure on the hydraulic casing 228 is away from the engine, the two forces balance out in the hydraulic or other medium used in diaphragm 229 and casing 228.

This form of the invention has the advantages referred to in the form of invention in Fig. 1 in addition to the advantage of not requiring adjustment. The floating members 221 and 214 may assume the position shown in Fig. 5 regardless of wear or the like on the clutching parts 201, 206 and 207, and the free-floating of the member 228 on the studs 232 permits this to take place while anchoring the entire clutch operating mechanism against rotation to permit connection of the line 237.

It will be apparent that instead of using the fluid mechanism shown in Fig. 5 the mechanism shown in Fig. 4 could be employed in connection with this form of the invention and it is intended to encompass within the invention this form of clutch.

I have disclosed preferred forms of my invention, which may be embodied in different forms, and it is not my intention to be limited to the specific forms shown but to be limited only to the invention claimed herein.

I claim:

1. In a clutch having a rotatable member carrying an axially apertured cover plate and an axially shiftable, axially apertured, pressure plate between said member and said cover plate, the combination of an axially shiftable sleeve extending axially through said cover plate and pressure plate, having toward its inner end a concentric annular anti-friction bearing, having an outer race positioned to engage said pressure plate to move it toward said cover plate on shifting of said sleeve, said sleeve having an inwardly facing abutment toward its outer end, a second sleeve slideably mounted on said first sleeve between said cover plate and said abutment and having toward its inner end a concentric annular anti-friction bearing having an outer race disposed to transmit thrust from said second sleeve to said cover plate on movement of said second sleeve toward said cover plate, said second sleeve having an outwardly facing abutment toward its outer end, and means for causing relative movement between said sleeves to move said pressure plate toward said cover plate comprising an annular casing and an annular fluid-operated diaphragm disposed concentrically to engage said abutments on said sleeves and urge said abutments apart to disengage such clutch.

2. In a clutch having a rotatable member carrying an axially apertured cover plate and an axially shiftable, axially apertured, pressure plate between said member and said cover plate, and compression spring means between and bearing on said cover plate and said pressure plate to urge said pressure plate toward said member for clutching engagement, the combination of an axially shiftable sleeve extending axially through said cover plate and pressure plate, having toward its inner end a concentric annular anti-friction bearing, having an outer race positioned to engage said pressure plate to move it toward said cover plate on shifting of said sleeve, said sleeve having an inwardly facing abutment toward its outer end, a second sleeve slideably mounted on said first sleeve between said cover plate and said abutment and having toward its inner end a concentric annular anti-friction bearing having an outer race disposed to transmit thrust from said second sleeve to said cover plate on movement of said second sleeve toward said cover plate, said second sleeve having an outwardly facing abutment toward its outer end, and means for causing relative movement between said sleeves to move said pressure plate toward said cover plate, positioned to engage and urge said abutments apart with the clutch disengaging force acting on said inwardly-facing abutment and with the reaction being taken on said outwardly-facing abutment and transmitted to said cover plate to disengage such clutch whereby the clutching release loads are self-contained in the clutch structure.

3. In a clutch having a rotatable member carrying an axially apertured cover plate and an axially shiftable, axially apertured, pressure plate between said member and said cover plate, the combination of an axially shiftable sleeve extending axially through said cover plate and pressure plate, having toward its inner end an abutment to engage said pressure plate to move it toward said cover plate on shifting of said sleeve, said sleeve having an inwardly facing abutment toward its outer end, a second sleeve slideably mounted on said first sleeve between said cover plate and said abutment and having toward its inner end an abutment to transmit thrust from said second sleeve to said cover plate on movement of said second sleeve toward said cover plate, said second sleeve having an outwardly facing abutment toward its outer end, and means for causing relative movement between said sleeves to move said pressure plate toward said cover plate comprising an annular casing and an annular fluid-operated diaphragm disposed concentrically to engage said abutments on said sleeves and urge said abutments apart to disengage such clutch.

4. In a clutch having a rotatable member carrying an axially apertured cover plate and an axially shiftable, axially apertured pressure plate between said member and said cover plate, the combination of an axially shiftable sleeve extending axially through said cover plate and pressure plate, having toward its inner end means to engage said pressure plate to move it toward said cover plate on shifting of said sleeve, said sleeve having an inwardly facing abutment toward its outer end, a second sleeve slideably mounted on said first sleeve between said cover plate and said abutment and having toward its inner end means disposed to transmit thrust from said second sleeve to said cover plate on movement of said second sleeve toward said cover plate and having an outwardly facing abutment at its outer end, means for causing relative movement between said sleeves to move said pressure plate toward said cover plate comprising an annular casing and an annular diaphragm disposed concentrically to engage said abutments on said sleeves and urge said abutments apart to disengage such clutch.

5. In a clutch having a rotatable member carrying a cover plate, and an axially shiftable pressure plate between said member and said cover plate, the combination of an axially shiftable member extending through said cover plate and said pressure plate, having anti-friction means thereon to engage said pressure plate to move it toward said cover plate to clutch-disengaging position, a second axially shiftable member having anti-friction means thereon to engage said cover plate and resist movement toward said pressure plate and fluid-actuated means operatively associated with said axially shiftable members to cause relative movement therebetween and movement of said pressure plate toward said cover plate to disengage the clutch comprising means operatively associated with said first-mentioned axially shiftable member to move it to clutch-disengaging position and operatively associated with said second axially shiftable member to transmit the reaction attendant on moving the first-mentioned axially shiftable member to clutch-disengaged position to said second axially shiftable member to force it to cover-plate-engaging position in which its movement toward said pressure plate is resisted whereby the release loads are self-contained in the clutch.

6. In a clutch having a rotatable member carrying a cover plate, and an axially shiftable pressure plate between said member and said cover plate, the combination of an axially shiftable member extending through said cover plate and said pressure plate, having means thereon to engage said pressure plate to move it toward said cover plate to clutch-disengaging position, a second axially shiftable member having means thereon to engage said cover plate and resist movement toward said pressure plate and fluid-actuated means operatively associated with said axially shiftable members to cause relative movement therebetween and movement of said pressure plate toward said cover plate to disengage the clutch comprising means operatively associated with said first-mentioned axially shiftable member to move it to clutch-disengaging position and operatively associated with said second axially shiftable member to transmit the reaction attendant on moving the first-mentioned axially shiftable member to clutch-disengaged position to said second axially shiftable member to force it to cover-plate-engaging position in which its movement toward said pressure plate is resisted whereby the release loads are self-contained in the clutch.

7. In a clutch having a rotatable member carrying a cover plate, and an axially shiftable pressure plate between said member and said cover plate, the combination of an axially shiftable member extending through said cover plate and said pressure plate, having anti-friction means thereon to engage said pressure plate to move it toward said cover plate to clutch-disengaging position, a second axially shiftable member having anti-friction means thereon to engage said cover plate and resist movement toward said pressure plate and means operatively associated with said axially shiftable members to cause relative movement therebetween and movement of said pressure plate toward said cover plate to disengage the clutch comprising means operatively associated with said first-mentioned axially shiftable member to move it to clutch-disengaging position and operatively associated with said second axially shiftable member to transmit the reaction attendant on moving the first-mentioned axially shiftable member to clutch-disengaged position to said second axially shiftable member to force it to coverplate-engaging position in which its movement toward said pressure plate is resisted whereby the release loads are self-contained in the clutch.

8. In a clutch having a rotatable member carrying a cover plate, and an axially shiftable pressure plate between said member and said cover plate, the combination of an axially shiftable member extending through said cover plate and said pressure plate, having means thereon to engage said pressure plate to move it toward said cover plate to clutch-disengaging position, a second axially shiftable member having means thereon to engage said cover plate and resist movement toward said pressure plate and means operatively associated with said axially shiftable members to cause relative movement therebetween and movement of said pressure plate toward said cover plate to disengage the clutch comprising means operatively associated with said first-mentioned axially shiftable member to move it to clutch-disengaging position and operatively associated with said second axially shiftable member to transmit the reaction attendant on moving the first-mentioned axially shiftable member to clutch-disengaged position to said second axially shiftable member to force it to cover-plate-engaging position in which its movement toward said pressure plate is resisted whereby the release loads are self-contained in the clutch.

9. In a clutch having a rotatable member carrying an axially apertured cover plate and an axially shiftable, axially apertured, pressure plate between said member and said cover plate, the combination of an axially shiftable sleeve extending axially through said cover plate and pressure plate, having toward its inner end a concentric annular anti-friction bearing, having an outer race positioned to engage said pressure plate to move it toward said cover plate on shifting of said sleeve, said sleeve having an inwardly facing abutment toward its outer end, a second sleeve slideably mounted on said first sleeve between said cover plate and said abutment and having toward its inner end a concentric annular anti-friction bearing having an outer race disposed to transmit thrust from said second sleeve to said cover plate on movement of said second sleeve toward said cover plate, said second sleeve having an outwardly facing abutment toward its outer end, and means for causing relative movement between said sleeve to move said pressure plate toward said cover plate comprising an annular casing and an annular vacuum operated diaphragm and means connected to said casing and engaging one of said abutments and means connected to said diaphragm and engaging the other of said abutments, said casing and diaphragm being disposed to urge said abutments apart on exhaustion of fluid from said casing to disengage said clutch.

10. In a clutch having a rotatable member carrying an axially apertured cover plate and an axially shiftable, axially apertured, pressure plate between said member and said cover plate, the combination of an axially shiftable sleeve extending axially through said cover plate and pressure plate, having toward its inner end an abutment to engage said pressure plate to move it toward said cover plate on shifting of said sleeve, said sleeve having an inwardly facing abutment toward its outer end, a second sleeve slideably mounted on said first sleeve between said cover plate and said abutment and having toward its inner end an abutment to transmit thrust from said second sleeve to said cover plate on movement of said second sleeve toward said cover plate, said second sleeve having an outwardly facing abutment toward its outer end, and means for causing relative movement between said sleeves to move said pressure plate toward said cover plate comprising an annular casing and an annular vacuum operated diaphragm and means connected to said casing and engaging one of said abutments and means connected to said diaphragm and engaging the other of said abutments, said casing and diaphragm being disposed to urge said abutments apart on exhaustion of fluid from said casing to disengage said clutch.

11. In a clutch having a rotatable member carrying a cover plate, and an axially shiftable pressure plate between said member and said cover plate, the combination of an axially shiftable member extending through said cover plate and said pressure plate, having means thereon to engage said pressure plate to move it toward said cover plate to clutch-disengaging position, a second axially shiftable member having means thereon to engage said cover plate and resist movement toward said pressure plate and vacuum operated means operatively associated with said axially shiftable members to cause relative movement therebetween and movement of said pressure plate toward said cover plate to disengage the clutch comprising means operatively associated with said first-mentioned axially shiftable member to move it to clutch-disengaging position and operatively associated with said second axially shiftable member to transmit the reaction attendant on moving the first-mentioned axially shiftable member to clutch-disengaged position to said second axially shiftable member to force it to cover-plate-engaging position in which its movement toward said pressure plate is resisted whereby the release loads are self-contained in the clutch.

12. In a clutch having a rotatable member carrying an axially apertured cover plate and an axially shiftable, axially apertured, pressure plate between said member and said cover plate, and spring means normally urging said pressure plate toward said member to clutch engaged position, the combination of an axially floating sleeve extending axially through said cover plate and pressure plate, having toward its inner end a concentric annular anti-friction bearing, having an outer race positioned to engage said pressure plate to move it toward said cover plate on shifting of said sleeve, said sleeve having an inwardly facing abutment toward its outer end, a second axially floating sleeve slideably mounted on said first sleeve between said cover plate and said abutment and having toward its inner end a concentric annular anti-friction bearing having an outer race disposed to transmit thrust from said second sleeve to said cover plate on movement of said second sleeve toward said cover plate, said second sleeve having an outwardly facing abutment toward its outer end, and means for causing relative movement between said sleeves to move said pressure plate toward said cover plate comprising an annular casing and an annular fluid-operated diaphragm disposed concentrically to engage said abutments on said sleeves and urge said abutments apart to maintain contact between said bearings and said cover plate and pressure plate when the clutch is in engaged position, under a low pressure of an order having no material effect on said spring means and to disengage such clutch on the application of working pressure.

13. In a clutch having a rotatable member carrying an axially apertured cover plate and an axially shiftable, axially apertured, pressure plate between said member and said cover plate, and spring means normally urging said pressure plate toward said member to clutch engaged position, the combination of an axially floating sleeve extending axially through said cover plate and pressure plate, having toward its inner end a concentric annular anti-friction bearing, having an outer race positioned to engage said pressure plate to move it toward said cover plate on shifting of said sleeve, said sleeve having an inwardly facing abutment toward its outer end, a second axially floating sleeve slideably mounted on said first sleeve between said cover plate and said abutment and having toward its inner end a concentric annular anti-friction bearing having an outer race disposed to transmit thrust from said second sleeve to said cover plate on movement of said second sleeve toward said cover plate, said second sleeve having an outwardly facing abutment toward its outer end, and means for causing relative movement between said sleeves to move said pressure plate toward said cover plate, positioned to engage and urge said abutments apart to maintain contact between said bearings and said cover plate and pressure plate when the clutch is in engaged position under a low pressure of an order having no material effect on said spring means and to disengage such clutch on the application of working pressure.

14. In a clutch having a rotatable member carrying a cover plate, and an axially shiftable pressure plate between said member and said cover plate, and spring means normally urging said pressure plate toward said member to clutch engaged position, the combination of an axially floating member extending through said cover plate and said pressure plate, having anti-friction means thereon to engage said pressure plate to move it toward said cover plate, a second axially floating member having anti-friction means thereon to engage said cover plate and resist movement toward said pressure plate and fluid-actuated means operatively associated with said axially floating members to cause relative movement therebetween and movement of said pressure plate toward said cover plate to maintain contact between said anti-friction means and said cover plate and pressure plate when the clutch is in engaged position under a low pressure of an order having no material effect on said spring means and to disengage the clutch on the application of working pressure.

15. In a clutch having a rotatable member carrying a cover plate, and an axially shiftable pressure plate between said member and said cover plate, and spring means normally urging said pressure plate toward said member to clutch engaged position, the combination of an axially floating member extending through said cover plate and said pressure plate, having first thrust bearing means thereon to engage said pressure plate to move it toward said cover plate, a second axially floating member having second thrust bearing means thereon to engage said cover plate to resist movement of said second member toward said pressure plate and fluid-actuated means operatively connected to said axially floating members to cause relative movement therebetween to maintain contact between said second bearing means and said cover plate and between said first bearing means and said pressure plate when the clutch is in engaged position and the fluid-actuated means is under a low pressure of an order having no material effect on said spring means, and the fluid-actuated means disengaging the clutch on the application of working pressure.

16. In a clutch having a rotatable member carrying a cover plate, and an axially shiftable pressure plate between said member and said cover plate, and spring means normally urging said pressure plate toward said member to clutch engaged position, the combination of an axially floating member extending through said cover plate and said pressure plate, having anti-friction means thereon to engage said pressure plate to move it toward said cover plate, a second axially floating member having anti-friction means thereon to engage said cover plate and resist movement toward said pressure plate and means operatively associated with said axially floating members to cause relative movement therebetween and movement of said pressure plate toward said cover plate to maintain contact between said anti-friction means and said cover plate and pressure plate when the clutch is in engaged position under a low pressure of an order having no material effect on said spring means and to disengage the clutch on the application of working pressure.

17. In a clutch having a rotatable member carrying a cover plate, and an axially shiftable pressure plate between said member and said cover plate, and spring means normally urging said pressure plate toward said member to clutch engaged position, the combination of an axially floating member extending through said cover plate and said pressure plate, having first thrust bearing means thereon to engage said pressure plate to move it toward said cover plate, a second axially floating member having second thrust bearing means thereon to engage said cover plate to resist movement of said second member toward said pressure plate and fluid-actuated means operatively connected to said axially floating members to cause relative movement therebetween to maintain contact between said second bearing means and said cover plate and between said first bearing means and said pressure plate when the clutch is in engaged position and the fluid-actuated means is under a low pressure of an order having no material effect on said spring means, and the fluid-actuated means disengaging the clutch on the application of working pressure.

18. In a clutch having a rotatable member carrying an axially apertured cover plate and an axially shiftable, axially apertured, pressure plate between said member and said cover plate, and spring means normally urging said pressure plate toward said member to clutch engaged position, the combination of an axially floating sleeve extending axially through said cover plate and pressure plate, having toward its inner end a concentric annular anti-friction bearing, having an outer race positioned to engage said pressure plate to move it toward said cover plate on shifting of said sleeve, said sleeve having an inwardly facing abutment toward its outer end, a second axially floating sleeve slidably mounted on said first sleeve between said cover plate and said abutment and having toward its inner end a concentric annular anti-friction bearing having an outer race disposed to transmit thrust from said second sleeve to said cover plate on movement of said second sleeve toward said cover plate, said second sleeve having an outwardly facing abutment toward its outer end, and means for causing relative movement between said sleeves to move said pressure plate toward said cover plate comprising an annular casing and an annular vacuum operated diaphragm and means connected to said casing and engaging one of said abutments and means connected to said diaphragm and engaging the other of said abutments, said casing and diaphragm being disposed to urge said abutments apart on exhaustion of fluid from said casing to maintain contact between said bearings and said cover plate and pressure plate when the clutch is in engaged position under a low pressure of an order having no material effect on said spring means and to disengage said clutch on the application of working pressure.

19. In a clutch having a rotatable member carrying a cover plate, and an axially shiftable pressure plate between said member and said cover plate, and spring means normally urging said pressure plate toward said member to clutch engaged position, the combination of an axially floating member extending through said cover plate and said pressure plate, having first thrust bearing means thereon to engage said pressure plate to move it toward said cover plate, a second axially floating member having second thrust bearing means thereon to engage said cover plate to resist movement of said second member toward said pressure plate and vacuum operated means operatively connected to said axially floating members to cause relative movement therebetween to maintain contact between said second bearing means and said cover plate and between said second bearing means and said pressure plate when the clutch is in engaged position and the vacuum operated means is under a pressure slightly below atmospheric of an order having no material effect on said spring means and to disengage the clutch on the application of a greater vacuum.

THOMAS BACKUS.

References Cited in the file of this patent

UNITED STATES PATENTS

| Number | Name | Date |
|---|---|---|
| 1,270,794 | Dawson et al. | July 2, 1918 |
| 1,401,551 | Parsons | Dec. 27, 1921 |
| 2,057,744 | Sanford | Oct. 20, 1936 |
| 2,089,472 | Geyer | Aug. 10, 1937 |
| 2,211,191 | Wolfran | Aug. 13, 1940 |
| 2,345,860 | Scott-Iverson | Apr. 4, 1944 |
| 2,393,835 | Stevenson | Jan. 29, 1946 |

FOREIGN PATENTS

| Number | Country | Date |
|---|---|---|
| 17,167 | Great Britain | Aug. 5, 1911 |
| 690,720 | France | June 24, 1930 |